Feb. 17, 1970 K. CHMILLON 3,496,286

TWO-CAMERA COLOR TELEVISION SYSTEM

Filed Sept. 8, 1966

Inventor:
Klaus Chmillon

3,496,286
TWO-CAMERA COLOR TELEVISION SYSTEM

Klaus Chmillon, Darmstadt, Germany, assignor to Fernseh G.m.b.H., Darmstadt, Germany Filed Sept. 8, 1966, Ser. No. 578,961
Claims priority, application Germany, Sept. 11, 1965, F 47,171
Int. Cl. H04n 5/38
U.S. Cl. 178—5.4 5 Claims

ABSTRACT OF THE DISCLOSURE

Red and blue color component images are projected side-by-side on the photosensitive surface of a first television tube, while a green color component image is projected on a photosensitive surface of a second television pick-up tube. The horizontal scanning frequency of the second tube is twice that of the first tube. The output of the second tube is directly connected to the green transmission channel, while the output of the first tube is directly connected to the red transmission channel and via a delay to the blue transmission channel during scanning of the red color component image, and directly connected to the blue transmission channel and via the delay to the red transmission channel during the scanning of the blue color component image.

This invention relates to processes of obtaining color television picture signals wherein light originating from an object to be televised is split up, using optical means, into color component images corresponding to the primary colors red, blue and green and corresponding color signals are each delivered over an individual color channel and to color television camera systems for carrying out above processes.

In a known process of developing color television picture signals, the color component images of the object are reproduced on the image receiving surface of a television pick-up tube according to each of the individual primary colors. Thus, a total of three camera tubes is needed for which a relatively great technical expenditure is necessary.

In further known processes of taking color television pictures, only two pick-up tubes are employed. These further known methods involve relatively great technical expense and have not proved fully satisfactory in practice.

It is therefore an object of the present invention to provide processes of, and camera systems for, creating color television picture signals which overcome the disadvantages of the known methods.

According to the present invention, the light emanating from the object to be televised is delivered by optical means to create three color component images corresponding to the three primary colors, red, blue and green. The first and seocnd of these color component images are projected side by side in line direction onto the image receiving surface of a first television pick-up tube. The third of these color component images is projected onto the image receiving surface of a second television pick-up tube. The horizontal scanning frequency of the second television pick-up tube is twice the frequency of the first television pick-up tube. The output signal of the first television pick-up tube is fed directly to the channel corresponding to the color of the first color component image during the scanning of the first color component image and is fed with time delay to the channel corresponding to the color component image not then being scanned. The time delay mentioned above is substantially equal to the time necessary to scan one line of one of the color component images. The output signal of the seound television pick-up tube is directly connected to the transmitter channel corresponding to the third primary color.

This invention is also characterized by the fact that a color television camera pick-up system according to this invention has substantially the same sensitivity as a color camera equipped with three television pick-up tubes. In addition, the invention is distinguished by the fact that relatively little technical expanse is necessary for carrying it out.

The invention in an example of an embodiment thereof is described below with reference to the accompanying diagrammatic drawings, comprising FIGS. 1 to 3, of which:

Figure 1:
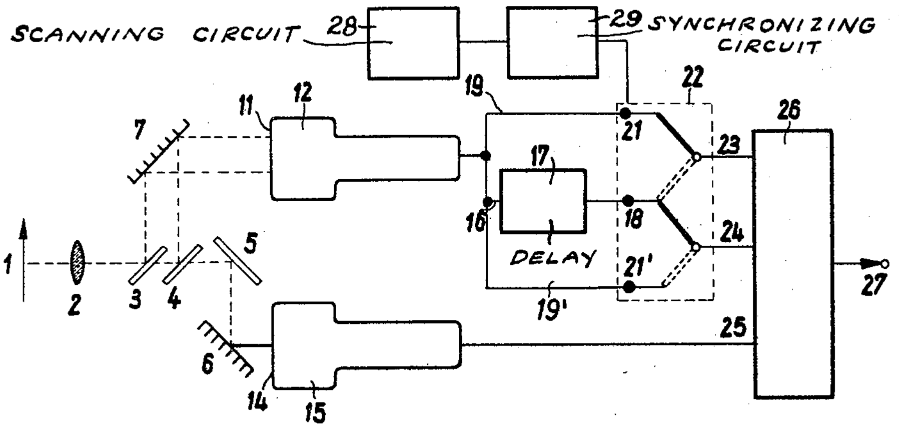
FIG. 1 shows a color television system wherein two camera tubes are used.

In the arrangement shown in FIG. 1, light originating from the object 1 is split up using the objective 2 and the dichoric mirrors 3, 4, 5, 6, 7, so that color component images are created corresponding to the primary colors red, blue and green.

Figure 2:
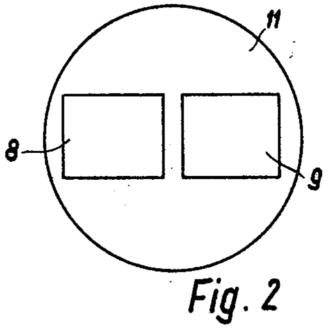
FIG. 2 shows the image receiving surface of the first television pick-up tube.
Figure 3:
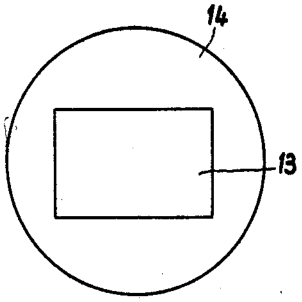
FIG. 3 shows the image receiving surface of the second television pick-up tube.

The images 8 and 9 corresponding for example to the colors red and blue, respectively, are projected side by side on the image-receiving surface 11 (FIG. 2) of the first television pick-up tube 12.

The image 13, corresponding for example to the primary color green, is projected on the image-receiving surface 14 of the second television pick-up tube 13.

The horizontal scanning frequency, at which the image 13 is scanned in the television pick-up tube 15, is twice as great as the horizontal scanning frequency with which the images 8 and 9 are scanned in the first television pick-up tube 12.

During the scanning of the first line of image 13, one line of image 8 is also scanned. During the scanning of the next line, namely the third line of the image 13, a line of the image 9 is scanned simulatenously. Thus, during the time of scanning the first, fifth, ninth, thirteenth . . . line of the "green" image 13, the "red" image 8 is being scanned too and during the scanning of the third, seventh, eleventh . . . lines of the "green" image 13, the "blue" image 9 is scanned too.

The output signal of the first television pick-up tube 12 is connected by a conductor 16 and through a delay line 17 to a switch input 18 and by conductor 19 to switch input 21 and by conductor 19′ to switch input 21′.

Using an electronic switch 22 synchronized with the scanning circuit 28 of the television pick-up tubes 12, 15 by means of synchronizing circuit 29, the first color channel 23 corresponding for example to the color red and the second color channel 24, corresponding for example to the color blue, are connected during the period of scanning of the image 8 to the circuit points 21 and 18, respectively. During the scanning of the image 9, the color channels 23 and 24 (contact positions shown in broken lines) are respectively connected to the circuit point 18 and through 21′ to the circuit point 21.

Using this electronic switch 22, therefore, appropriate color signals are constantly supplied to the color channels 23 and 24.

The output of the second television pick-up tube 15 is connected to third color channel 25, corresponding for example to the color green. The delay caused by the delay line 17 is equal to the period needed to scan one line of one of the images 8 or 9 in the horizontal direction.

In closed circuit operation, the color channels 23, 24 and 25 may transmit directly to appropriate color television re-production equipment (not illustrated). These color channels may, however, also be connected to a coder 26 which produces a composite color television signal in known manner and delivers it through the output 27.

It will be understood that each of the elements described above, or two or more together, may also find a useful application in other types of television camera systems differing from the types described above.

While the invention has been illustrated and described as embodied in color television camera systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characeristics of the generic or specific aspects of this invention and, therefore, such adaptations should and are intended to be comprehended within the meaning and range of equivalence of the following claims.

What is claimed as new and desired to be secured by Letters Patent is:

1. Color television system, comprising in combination, a first television pick-up tube, having a first image-receiving surface, and first scanning and transducing means for scanning lines of said first image-receiving surface at a first horizontal scanning frequency and transforming the light intensity variations of the scanned lines into corresponding first electrical signals; a second television pick-up tube, having a second image-receiving surface, and second scanning and transducing means for scanning lies of said second image-receiving surface at a second horizontal scanning frequency and transforming the light intensity variations of the scanned lines into corresponding second electrical signals; optical means for creating a first color component image, corresponding to the color red, of an object to be televised and a second color component image, corresponding to color blue, of said object being televised, on portions of said first image-receiving surface lying side-by-side in line direction; additional optical means for creating a third color component image, corresponding to the color green, of the object to be televised on said second image-receiving surface; first channel transmitting means, for transmitting first electrical signals corresponding to the color red; second channel transmitting means, for transmitting first electrical signals corresponding to the color blue; third channel transmitting means, for transmitting said second electrical signals; delay means furnishing a delay time corresponding to the time required for horizontal scanning of one color component image on said first image-receiving surface; conductor means directly connecting said second scanning and transducing means to said third channel, said first scanning and transducing means to said second channel, directly or through said delay means, and said first scanning and transducing means to said first channel, either directly or through said delay means; switching means associated with said conductor means and adjustable between a first condition in which said first channel is connected directly to said first scanning and transducing means and said second channel is connected through delay means to said first scanning and transducing means, and a second state wherein said first scanning and transducing means is connected directly to said second channel and to said first channel through said delay means; and synchronizing means for synchronizing said scanning and transducing means and said switching means in such a manner that said first channel is directly connected to said first scanning and transducing means during the horizontal scanning of the "red" color component image and said second channel is directly connected to said first scanning and transducing means during the horizontal scanning of said "blue" color component image.

2. A system as set forth in claim 1, wherein said second horizontal scanning frequency is substantially twice said first horizontal scanning frequency; and wherein said delay time is substantially equal to the time required for horizontal scanning of a color component image on said first image-receiving surface.

3. A system as set forth in claim 1, wherein said switching means comprise electronic switching means.

4. In a color television system having a first television pick-up tube with a first image-receiving surface, and a second television pick-up tube with a second image-receiving surface, a method for generating color television signals, comprising, in combination, the steps of creating a color component image corresponding to the color "red" and a second color component image corresponding to the color "blue" on said first image-receiving surface, side-by-side in a line direction; creating a third color component image corresponding to the color "green" on said second image-receiving surface; sequentially scanning lines of said first image-receiving surface at a first horizontal scanning frequency and transforming the light intensity variations of the scanned lines into corresponding first electrical signals; scanning said second image-receiving surface at substantially twice said first horizontal scanning frequency, and in synchronism therewith, and transforming the light intensity variations of the scanned lines into corresponding second electrical signals; directly transmitting said second electrical signals; and transmitting first electrical signals corresponding to the color component image being scanned directly, and first electrical signals corresponding to the color component image not being scanned with a delay time corresponding to the time required for horizontal scanning of said third color component image.

5. A method as set forth in claim 4, wherein said delay time is substantially equal to the time required for horizontal scanning of a line of said third color component image.

References Cited

UNITED STATES PATENTS

| | | | |
|---|---|---|---|
| 2,389,646 | 11/1945 | Sleeper | 178—5.2 |
| 2,857,455 | 10/1958 | Jolliffe | 178—5.2 X |
| 3,017,455 | 1/1962 | Watson | 178—5.4 |
| 3,296,367 | 1/1967 | Cassagne | 178—5.4 |

ROBERT L. GRIFFIN, Primary Examiner

J. C. MARTIN, Assistant Examiner